US012599840B2

(12) United States Patent
Ren

(10) Patent No.: US 12,599,840 B2
(45) Date of Patent: Apr. 14, 2026

(54) VIRTUAL CHARACTER CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Jiangfeng Ren, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 314 days.

(21) Appl. No.: 18/213,587

(22) Filed: Jun. 23, 2023

(65) Prior Publication Data

US 2023/0347247 A1     Nov. 2, 2023

Related U.S. Application Data

(63) Continuation of application No. PCT/CN2022/115035, filed on Aug. 26, 2022.

(30) Foreign Application Priority Data

Nov. 5, 2021     (CN) .......................... 202111307100.5

(51) Int. Cl.
*A63F 13/56* (2014.01)
*A63F 13/837* (2014.01)
(52) U.S. Cl.
CPC ............ *A63F 13/56* (2014.09); *A63F 13/837* (2014.09)
(58) Field of Classification Search
CPC ........ A63F 13/56; A63F 13/837; A63F 13/35; A63F 13/822; A63F 2300/807; A63F 2300/8076
See application file for complete search history.

(56) References Cited

U.S. PATENT DOCUMENTS

2018/0012419 A1* 1/2018 McGrath ............... G06F 3/0354
2020/0306643 A1 10/2020 Borovikov et al.

FOREIGN PATENT DOCUMENTS

CN     106492457 A     3/2017
CN     106548503 A     3/2017
CN     110538455 A     12/2019
(Continued)

OTHER PUBLICATIONS

Unity 2018—NPC smoothly turning to face the Player while within range, Jul. 2, 2018-Jul. 2, 2020, https://stackoverflow.com/questions/51127919/unity-2018-npc-smoothly-turning-to-face-the-player-while-within-range (Year: 2020).*
(Continued)

*Primary Examiner* — Kevin Y Kim
(74) *Attorney, Agent, or Firm* — Crowell & Moring LLP

(57)     ABSTRACT

This application discloses a virtual character control method and apparatus, a storage medium, and an electronic device. The method is performed by the electronic device, and includes: displaying a virtual scene in which a first virtual character is located and the first virtual character, the first virtual character being a non-player controlled character; displaying a rotation process of the first virtual character from a first direction to a second direction in a movement process of the first virtual character; and controlling, in the rotation process of the first virtual character, the first virtual character to perform multiple rotations continuously from the first direction to the second direction.

18 Claims, 13 Drawing Sheets

(56) References Cited

FOREIGN PATENT DOCUMENTS

| | | | |
|---|---|---|---|
| CN | 110721470 | A | 1/2020 |
| CN | 111841000 | A | 10/2020 |
| CN | 112704875 | A | 4/2021 |
| CN | 113198179 | A | 8/2021 |
| CN | 114011071 | A | 2/2022 |
| JP | 2001084402 | A | 3/2001 |
| KR | 2008-0008488 | A | 1/2008 |

OTHER PUBLICATIONS

Grant, Scott, Rotation test for NPC, Nov. 2, 2014, https://www.youtube.com/watch?v=kOMCA3ShL_8 (Year: 2014).*
CodeLikeMe, Unreal Third person Shooter #44—AI character Aiming Towards Player, Dec. 9, 2020, https://www.youtube.com/watch?v=JaWLePsCYzU (Year: 2020).*
Mighty_Loopy, Making an NPC look at your character, Apr. 2018, https://devforum.roblox.com/t/making-an-npc-look-at-your-character/114425 (Year: 2018).*
Office Action issued on Chinese application 202111307100.5 dated May 17, 2024, w/English translation15pages.
https://blog.csdn.net/gg_31788759/article/details/103267162, Nov. 27, 2019.
https://couchlearn.com/how-to-smoothly-rotate-ai-characters-in-unreal-engine-4, Dec. 17, 2020.
https://gwb.tencent.com/community/details/115596, Aug. 1, 2017.
International Search Report and Written Opinion including translation of PCT application PCT/CN2022/115035 dated Aug. 26, 2022, 16 pages.

* cited by examiner

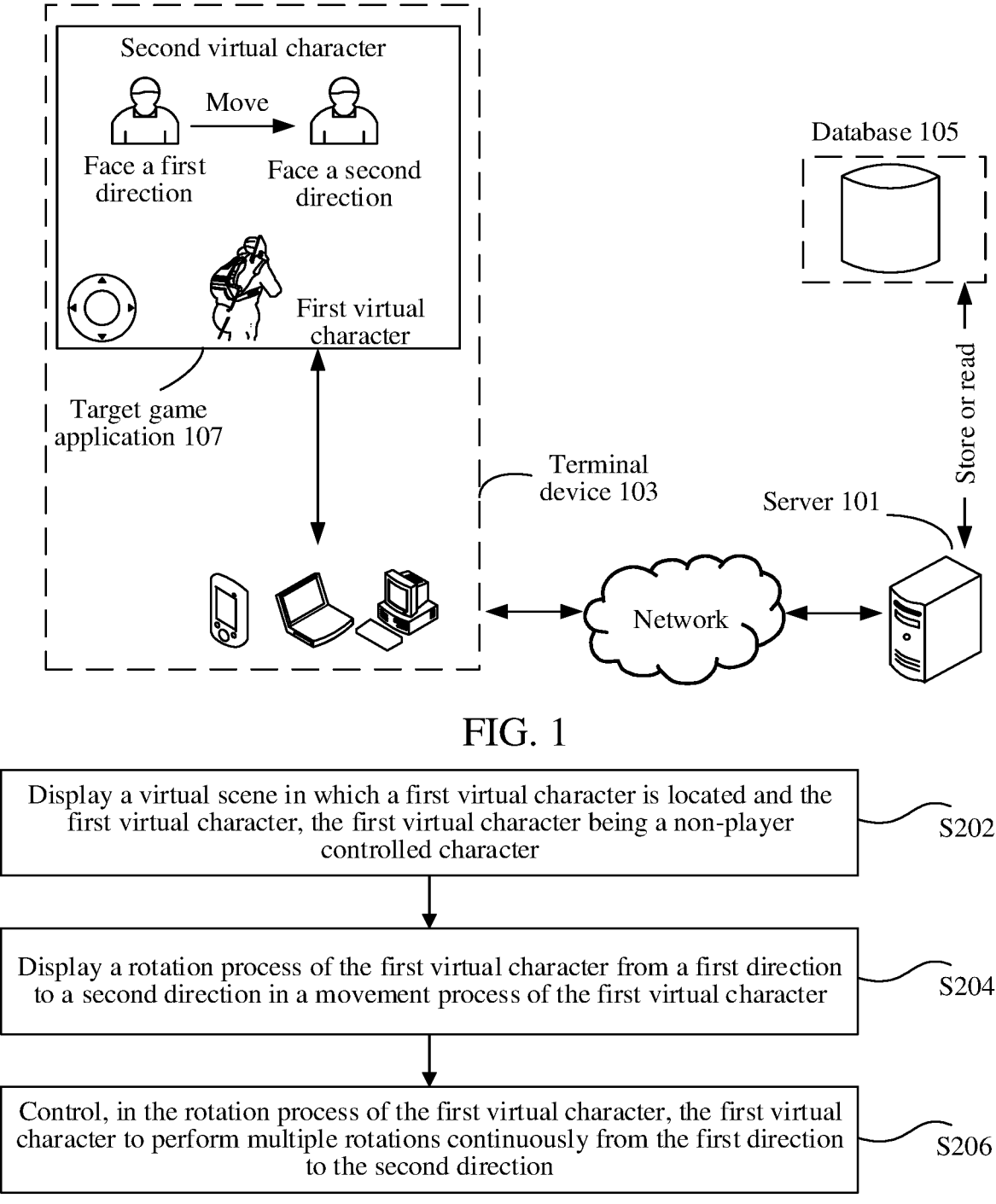

FIG. 1

| Display a virtual scene in which a first virtual character is located and the first virtual character, the first virtual character being a non-player controlled character | S202 |
|---|---|
| Display a rotation process of the first virtual character from a first direction to a second direction in a movement process of the first virtual character | S204 |
| Control, in the rotation process of the first virtual character, the first virtual character to perform multiple rotations continuously from the first direction to the second direction | S206 |

FIG. 2

First-person display interface 301

Third-person display interface 303

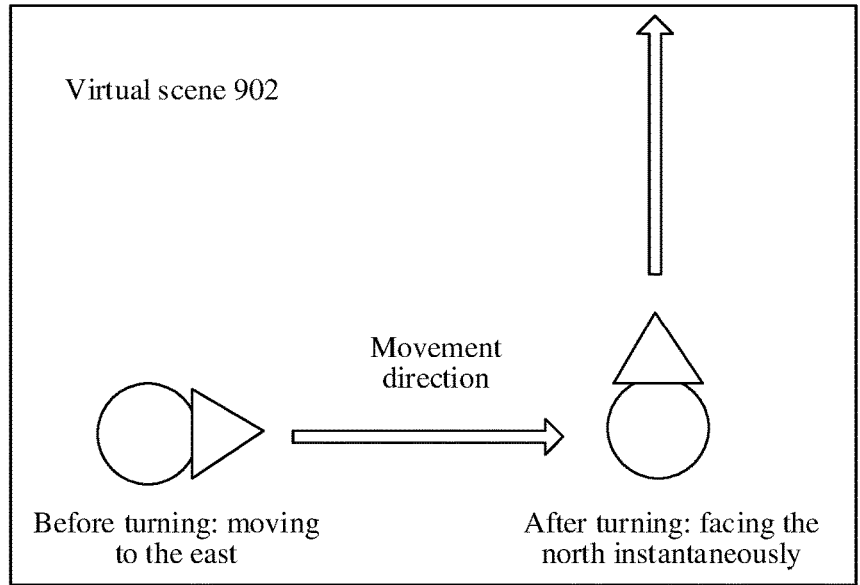
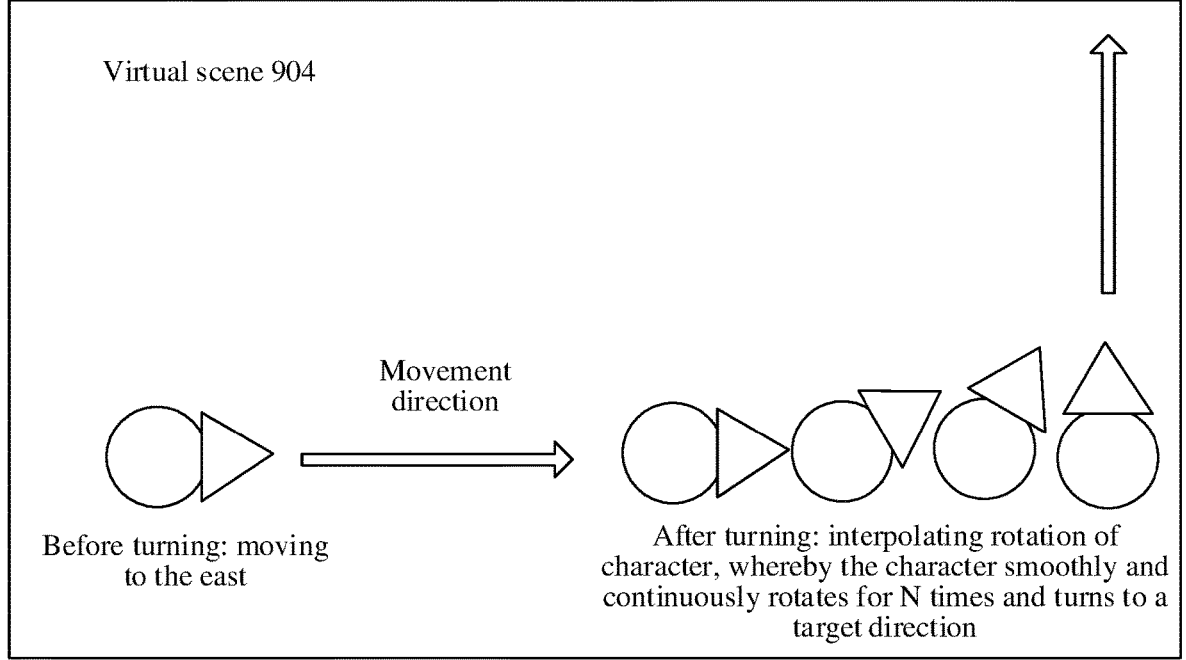
FIG. 9

1100

Enemy (target virtual character)

Demonstrate a process of animation in which a second virtual
character moves to the left while aiming at the enemy

VIRTUAL CHARACTER CONTROL METHOD AND APPARATUS, STORAGE MEDIUM, AND ELECTRONIC DEVICE

CROSS-REFERENCE TO RELATED APPLICATIONS

This application is a continuation of PCT/CN2022/115035, filed Aug. 26, 2022, which claims priority to Chinese Patent Application No. 202111307100.5, entitled "VIRTUAL CHARACTER CONTROL METHOD AND APPARATUS, STORAGE MEDIUM, AND ELECTRONIC DEVICE" filed to the China National Intellectual Property Administration on Nov. 5, 2021, wherein the entirety of each of these applications is hereby incorporated herein by reference in its entirety.

FIELD OF THE TECHNOLOGY

This application relates to the field of computers, and in particular to a virtual character control method and apparatus, a storage medium, and an electronic device.

BACKGROUND OF THE DISCLOSURE

Most of artificial intelligence (AI) virtual characters controlled based on behavior tree logic are now separated from character animations. The characters are controlled based on the behavior tree logic over character logic, and interfaces of the characters are called to make specific behaviors. The virtual characters controlled based on the behavior tree logic will behave mechanically like robots.

Since the traditional AI design only focuses on the logical control of a behavior tree instead of the animation performance of AI, the behavior tree often decides to turn AI instantaneously, which leads to the technical problems that the performance of an AI virtual character is not personified and the turning is not realistic.

In view of the foregoing problems, no effective solution has been proposed.

SUMMARY

Embodiments of this application provide a virtual character control method and apparatus, a storage medium, and an electronic device, so as to solve at least the technical problem in the related art that the performance of a virtual character is not personified and the turning is not realistic when the virtual character is controlled by AI.

According to one aspect of the embodiments of this application, a virtual character control method is provided. The method is performed by an electronic device and includes: displaying a virtual scene in which a first virtual character is located and the first virtual character, the first virtual character being a non-player controlled character; displaying a rotation process of the first virtual character from a first direction to a second direction in a movement process of the first virtual character; and controlling, in the rotation process of the first virtual character, the first virtual character to perform multiple rotations continuously from the first direction to the second direction.

According to another aspect of the embodiments of this application, a virtual character control method is further provided. The method is performed by an electronic device and includes: displaying a virtual scene in which a first virtual character is located and the first virtual character, the first virtual character being a non-player controlled character; obtaining a target turning instruction in a movement process of the first virtual character, the target turning instruction being used for instructing the first virtual character to rotate from a first direction to a second direction; and controlling, in the movement process of the first virtual character, the first virtual character to perform multiple rotations continuously from the first direction to the second direction in response to the target turning instruction.

According to another aspect of the embodiments of this application, a virtual character control apparatus is further provided, including: a first display module, configured to display a virtual scene in which a first virtual character is located and the first virtual character, the first virtual character being a non-player controlled character; a second display module, configured to display a rotation process of the first virtual character from a first direction to a second direction in a movement process of the first virtual character; and a first control module, configured to control, in the rotation process of the first virtual character, the first virtual character to perform multiple rotations continuously from the first direction to the second direction.

According to another aspect of the embodiments of this application, a virtual character control apparatus is further provided, including: a third display module, configured to display a virtual scene in which a first virtual character is located and the first virtual character, the first virtual character being a non-player controlled character; an obtaining module, configured to obtain a target turning instruction in a movement process of the first virtual character, the target turning instruction being used for instructing the first virtual character to rotate from a first direction to a second direction; and a second control module, configured to control, in the movement process of the first virtual character, the first virtual character to perform multiple rotations continuously from the first direction to the second direction in response to the target turning instruction.

According to yet another aspect of the embodiments of this application, a non-transitory computer-readable storage medium is further provided. The non-transitory computer-readable storage medium stores computer programs. The computer programs comprising instructions configured to cause a processor to: display a virtual scene in which a first virtual character is located and the first virtual character, the first virtual character being a non-player controlled character; display a rotation process of the first virtual character from a first direction to a second direction in a movement process of the first virtual character; and control, in the rotation process of the first virtual character, the first virtual character to perform multiple rotations continuously from the first direction to the second direction. According to yet another aspect of the embodiments of this application, a computer program product or a computer program is provided. The computer program product or the computer program includes computer instructions stored in a computer-readable storage medium. A processor of a computer device reads the computer instructions from the computer-readable storage medium. The processor executes the computer instructions to cause the computer device to perform the above virtual character control method.

According to yet another aspect of the embodiments of this application, an electronic device is further provided. The electronic device includes a memory and a processor. The memory stores at least one computer program. The processor is in communication with the memory and the processor is configured by the memory to: display a virtual scene in which a first virtual character is located and the first virtual character, the first virtual character being a non-player controlled character; obtain a target turning instruction in a movement process of the first virtual character, the target turning instruction being used for instructing the first virtual character to rotate from a first direction to a second direction; and control, in the movement process of the first virtual character, the first virtual character to perform multiple rotations continuously from the first direction to the second direction in response to the target turning instruction.

BRIEF DESCRIPTION OF THE DRAWINGS

The drawings described herein, which constitute a portion of this application, serve to provide a further understanding of this application. Schematic embodiments of this application and the descriptions thereof serve to explain this application and are not to be construed as unduly limiting this application. In the drawings:

FIG. 1 is a schematic diagram of an application environment of a virtual character control method according to an embodiment of this application.

FIG. 2 is a schematic flowchart of a virtual character control method according to an embodiment of this application.

FIG. 9 is a schematic diagram of another virtual character control method according to an embodiment of this application.

DESCRIPTION OF EMBODIMENTS

Figure 3:
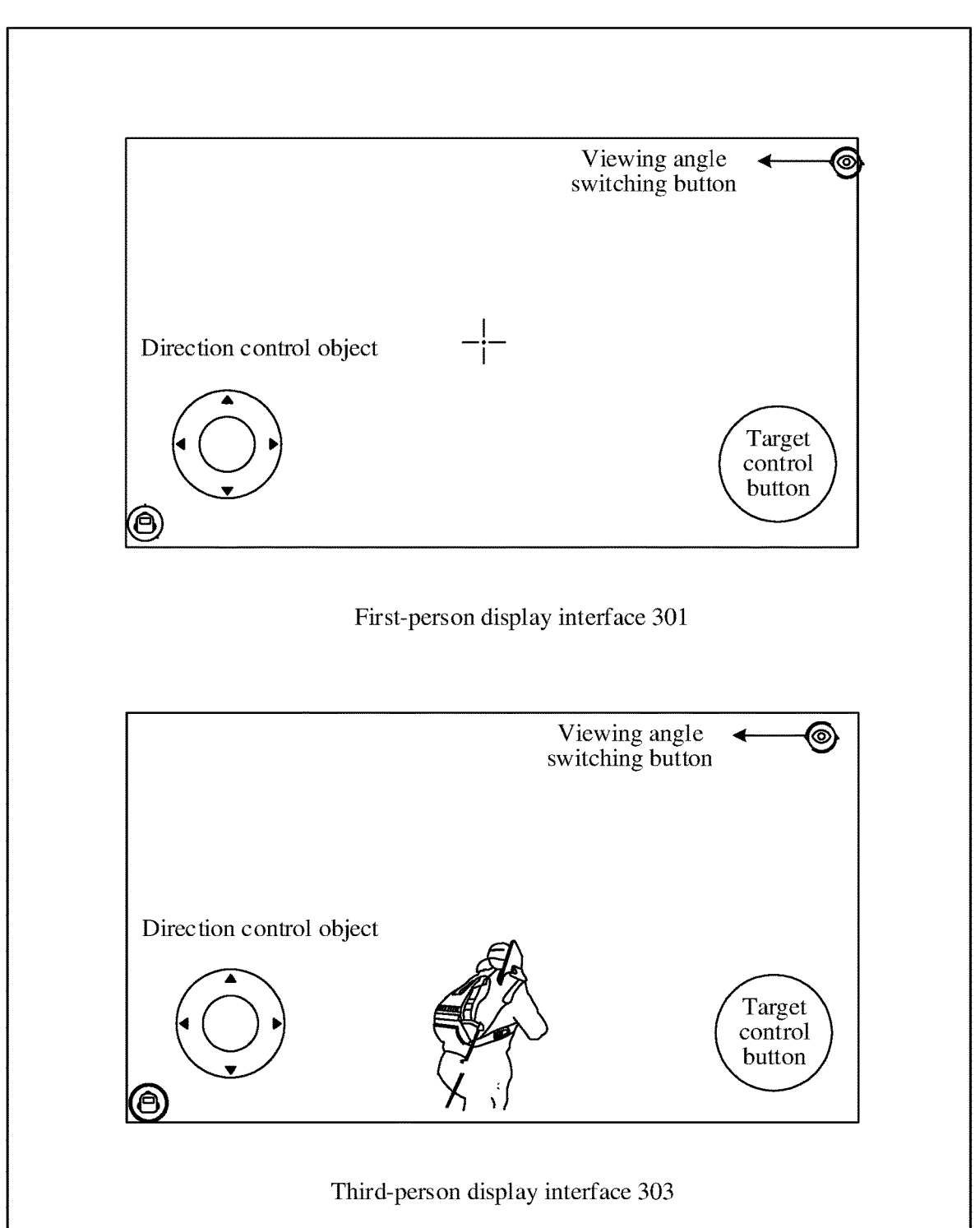
FIG. 3 is a schematic diagram of a virtual character control method according to an embodiment of this application.

In order to enable those skilled in the art to better under the solutions of this application, the following clearly and completely describes the technical solutions of the embodiments of this application with reference to the accompanying drawings in the embodiments of this application. Apparently, the described embodiments are merely some rather than all of the embodiments of this application. Based on the embodiments of this application, all other embodiments obtained by those of ordinary skill in the art without creative efforts shall fall within the scope of protection of this application.

The terms "first", "second" etc. in the specification and claims of this application and in the above drawings are used for distinguishing between similar objects and not necessarily for describing a particular order or sequential order. It is to be understood that such used data is interchangeable where appropriate whereby the embodiments of this application described here can be implemented in an order other than those illustrated or described here. In addition, the terms "include", "have", and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

First, some of the nouns or terms appearing in the process of describing the embodiments of this application are to be construed as follows:

Aim-Offset: An aiming offset is an animation blending space and is a tool technology for blending an upper body and a lower body of a character with different animations. For example, the character may be allowed to walk while aiming.

This application is illustrated with reference to the following embodiment.

According to one aspect of this embodiment of this application, a virtual character control method is provided. In this embodiment, the virtual character control method may be applied to a hardware environment composed of a server 101 and a terminal device 103 as shown in FIG. 1. As shown in FIG. 1, the server 101 is connected to the terminal device 103 via a network and may be configured to provide a service for the terminal device or an application installed on the terminal device. The application may be a video application, an instant messaging application, a browser application, an educational application, a game application, and the like. A database 105 may be provided on or separate from the server for providing data storage services, such as game data storage servers, for the server 101. The network may include, but is not limited to: a wired network and a wireless network. The wired network includes: a local area network, a metropolitan area network and a wide area network. The wireless network includes: Bluetooth, WIFI, and other networks implementing wireless communication. The terminal device 103 may be a terminal configured with an application, and may include, but is not limited to, at least one of the following: a computer device such as a mobile phone (for example, an Android mobile phone, an iOS mobile phone, or the like), a laptop computer, a tablet computer, a palmtop computer, a mobile Internet device (MID), a PAD, a desktop computer, and a smart television. The server may be a single server, may also be a server cluster composed of multiple servers, or may be a cloud server.

As shown in conjunction with FIG. 1, the virtual character control method may be implemented at the terminal device 103 by the following steps:

S1: Display a virtual scene in which a first virtual character is located and the first virtual character on the terminal device 103, the first virtual character being a non-player controlled character.

S2: Display a rotation process of the first virtual character from a first direction to a second direction on the terminal device 103 in a movement process of the first virtual character.

S3: Control, in the rotation process of the first virtual character, the first virtual character to perform multiple rotations continuously from the first direction to the second direction on the terminal device 103.

Figure 16:
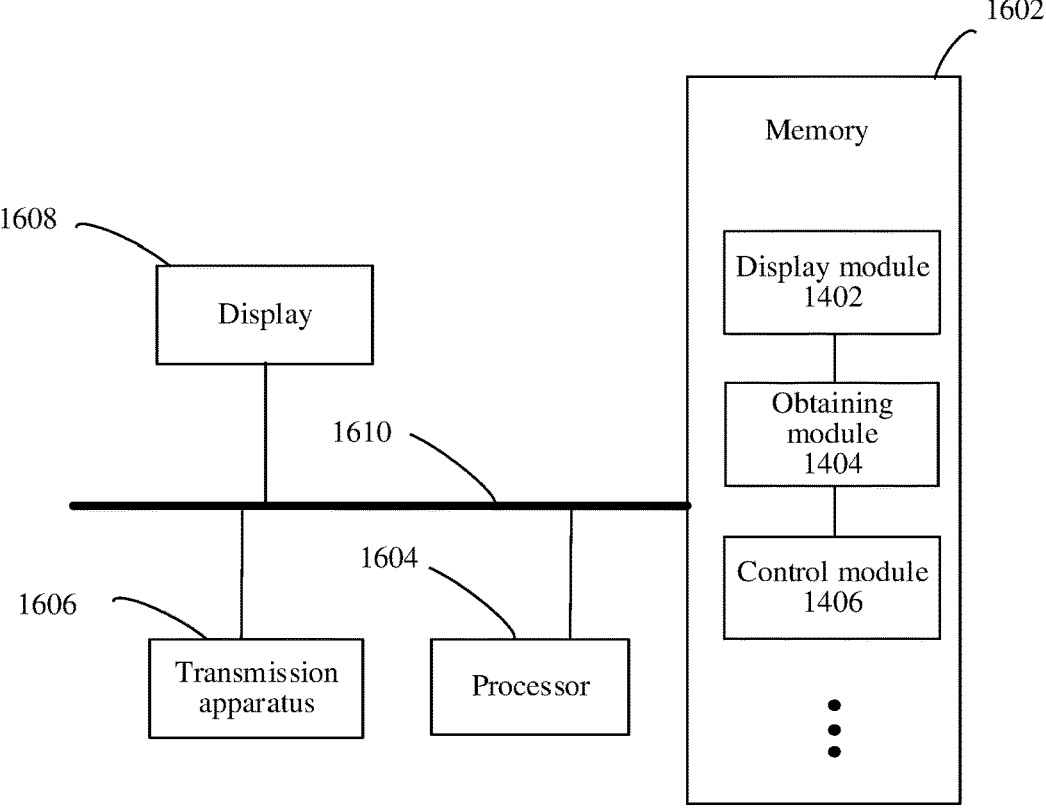
FIG. 16 is a schematic structural diagram of an electronic device according to an embodiment of this application.

In this embodiment, the virtual character control method may also be implemented by a server, for example, the server 101 shown in FIG. 1, or implemented jointly by the terminal device and the server; or implemented by an electronic device shown in FIG. 16.

The above is merely an example, and this embodiment is not particularly limited.

As an implementation, as shown in FIG. 2, the virtual character control method includes the following steps:

S202: Display a virtual scene in which a first virtual character is located and the first virtual character, the first virtual character being a non-player controlled character.

S204: Display a rotation process of the first virtual character from a first direction to a second direction in a movement process of the first virtual character.

S206: Control, in the rotation process of the first virtual character, the first virtual character to perform multiple rotations continuously from the first direction to the second direction.

In this embodiment of this application, a virtual scene in which a first virtual character is located and the first virtual character are displayed. The first virtual character is a non-player controlled character. A rotation process of the first virtual character from a first direction to a second direction is displayed in a movement process of the first virtual character. The first virtual character is controlled to perform multiple rotations continuously from the first direction to the second direction in the rotation process of the first virtual character. In this way, multiple rotations are performed continuously in the movement process of the first virtual character, whereby an AI virtual character designed based on a behavior tree is more like a real person player, thereby achieving the purpose of smoothly turning the AI virtual character and making behavior actions close to the real person player. Thus, the technical effect of optimizing the behavior performance of a virtual character controlled by AI and making the virtual character controlled by AI more personified, thereby solving the technical problem in the related art that the performance of the virtual character is not personified and the turning is not realistic when the virtual character is controlled by AI.

As an implementation, the virtual character control method further includes the following steps:

S1: Display a virtual scene in which a first virtual character is located and the first virtual character, the first virtual character being a non-player controlled character.

S2: Obtain a target turning instruction in a movement process of the first virtual character, the target turning instruction being used for instructing the first virtual character to rotate from a first direction to a second direction.

S3: Control, in the movement process of the first virtual character, the first virtual character to perform multiple rotations continuously from the first direction to the second direction in response to the target turning instruction.

In this embodiment, the game applications include, but are not limited to, one or more types of combined game applications such as a multiplayer online battle arena (MOBA) application and a shooting application. MOBA is also referred to as an action real-time strategy (ARTS). The MOBA game may be run on a terminal device (for example, a mobile phone terminal or a PC terminal).

In this embodiment, the virtual scene may include, but is not limited to, an MOBA game scene, a shooting game scene, and the like.

For example, the shooting game scene may include, but is not limited to, all games in which firearms are used for remote attacks such as a first-person shooting (FPS) game and a third-person shooting (TPS) game.

The FPS game belongs to a branch of an action (ACT) game, and as the name implies, the FPS game is a shooting game conducted in the subjective perspective of a player.

The TPS game is also one type of shooting game, and differs from the FPS game in that a virtual control object operated by a player is visible in a game display interface. The games may include, but are not limited to, the FPS game, the TPS game, a shooting game capable of switching between FPS and TPS, and the like. FIG. 3 is a schematic diagram of another virtual character control method according to an embodiment of this application. As shown in FIG. 3, a game display interface may be divided into a first-person display interface 301 and a third-person display interface 303, and includes, but is not limited to, a display interface for switching between FPS and TPS using a viewing angle switching button. A first virtual character moves through a direction control object as shown in FIG. 3.

The rotation process of the first virtual character from the first direction to the second direction may be implemented by obtaining a target turning instruction, but is not limited thereto. The target turning instruction may include, but is not limited to, a turning instruction transmitted by an AI controller for a target game application rather than a turning instruction transmitted by a player.

In this embodiment, the first virtual character is a non-player controlled character and may include, but is not limited to, a virtual character preset by a system and controlled by the AI controller.

Figure 4:
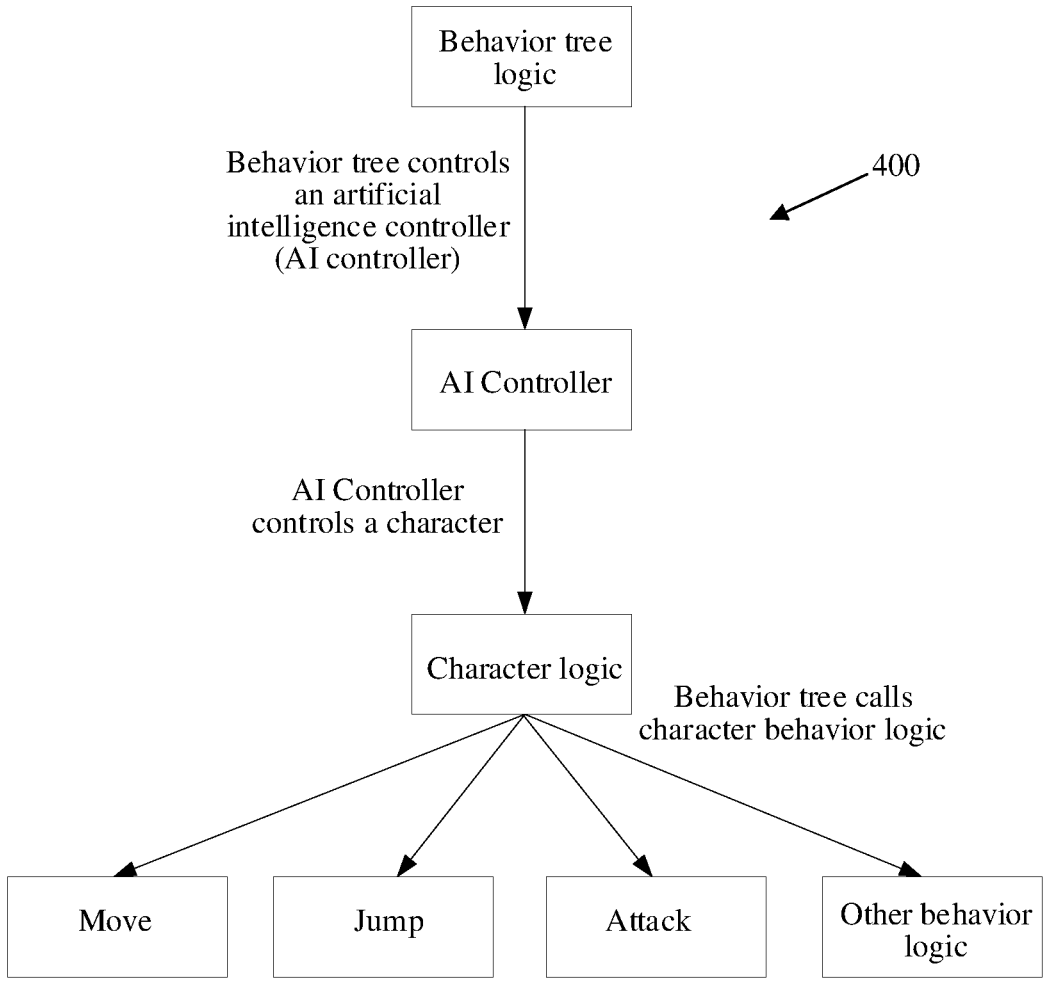
FIG. 4 is a schematic diagram of another virtual character control method according to an embodiment of this application.

For example, FIG. 4 is a schematic diagram 400 of another virtual character control method according to an embodiment of this application. As shown in FIG. 4, in the related art, the process in which AI controls a virtual character to execute a behavior may include, but is not limited to, controlling an AI controller through behavior tree logic, and adding a node in the behavior tree logic. The node is used for data interaction with an animation logic layer. Before controlling a character through the AI controller, an operation to be executed by the virtual character may be adaptively adjusted in the animation logic layer so as to execute corresponding character logic, for example, behavior logic of the virtual character, such as "moving", "jumping", and "attacking".

Figure 5:
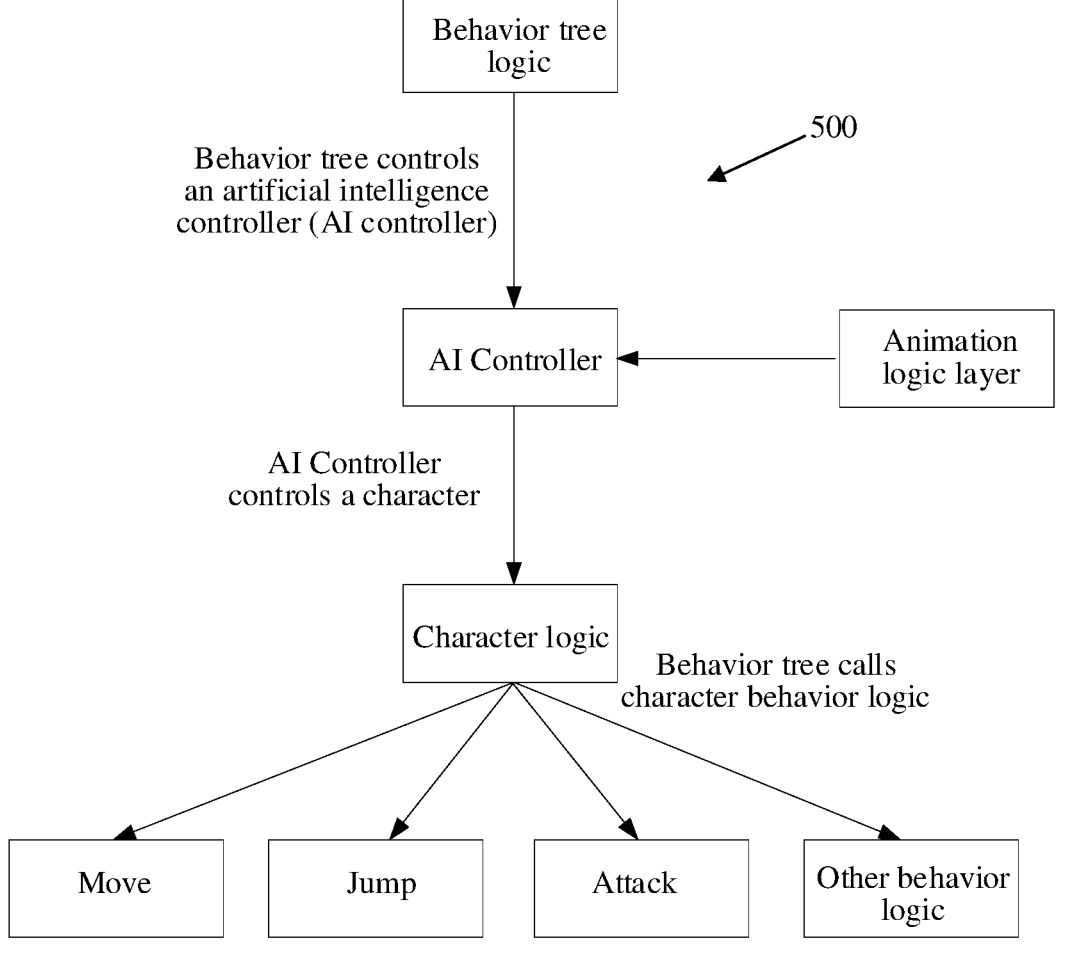
FIG. 5 is a schematic diagram of another virtual character control method according to an embodiment of this application.

FIG. 5 is a schematic diagram 500 of another virtual character control method according to an embodiment of this application. As shown in FIG. 5, in this embodiment, the process in which AI controls a virtual character to execute a behavior may include, but is not limited to, controlling an AI controller through behavior tree logic. The character is controlled through the AI controller so as to execute corresponding character logic, for example, behavior logic of the virtual character, such as "moving", "jumping", and "attacking".

Specifically, for example, the virtual character moves and turns. In terms of animation logic, a smooth rotation function (EnableSmoothRotation) node is designed for allowing the AI controller to smoothly turn to a character movement direction for use with a behavior tree when AI controls the virtual character to move. The node may be enabled when needed and disabled when not needed.

In this embodiment, the rotation process of the first virtual character rotating from the first direction to the second direction is used for instructing the first virtual character to rotate from the first direction to the second direction. Specifically, the process may include, but is not limited to, instructing the first virtual character to rotate from the first direction to the second direction according to a configured angle threshold allowing rotation in the virtual scene. For example, the process may include, but is not limited to, configuring the angle threshold to be greater than 0° and less than 360°. When the first direction is that the virtual character is displayed in the virtual scene with a side of 45° and when the second direction instructs the virtual character to turn from −45° to 0°, AI controls the first virtual character to rotate to face the virtual character controlled by the player.

Figure 6:
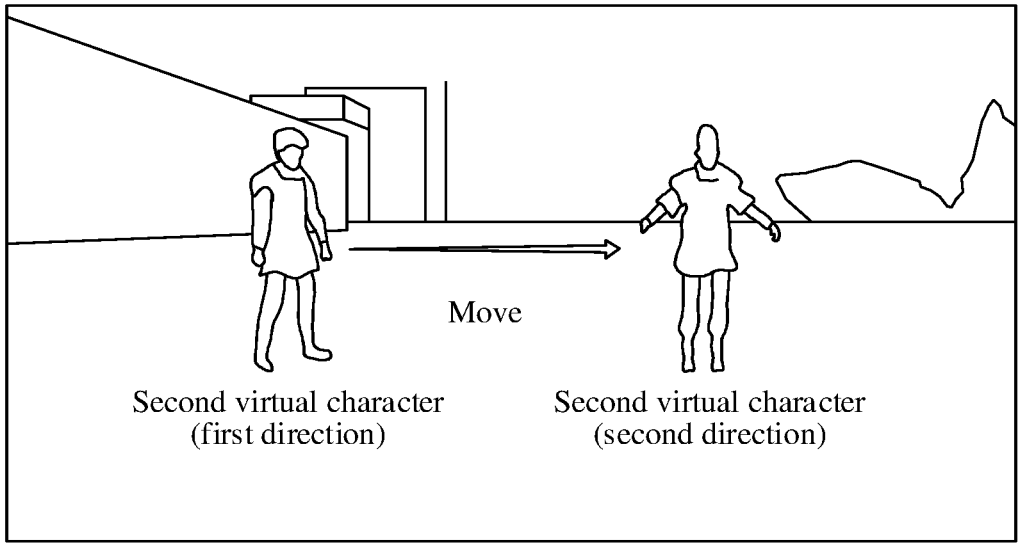
FIG. 6 is a schematic diagram of another virtual character control method according to an embodiment of this application.

For example, FIG. 6 is a schematic diagram of another virtual character control method according to an embodiment of this application. As shown in FIG. 6, in the related art, as AI controls a virtual character to move, if the virtual character needs to rotate, the virtual character directly rotates from a first direction to a second direction at a corresponding angle.

Figure 7:
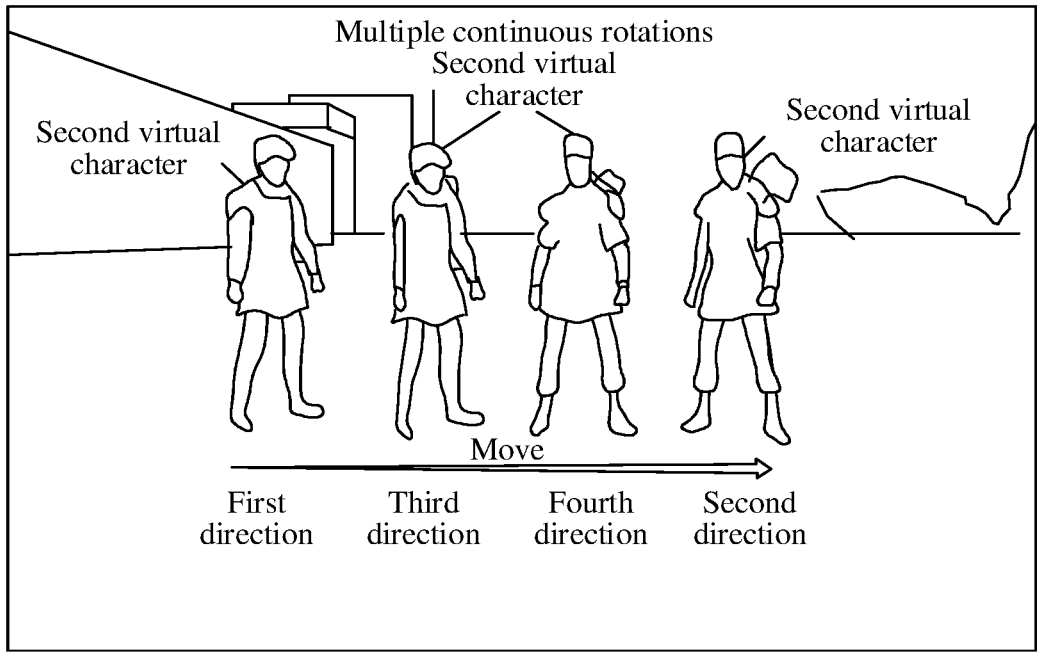
FIG. 7 is a schematic diagram of another virtual character control method according to an embodiment of this application.

For example, FIG. 7 is a schematic diagram of another virtual character control method according to an embodiment of this application. As shown in FIG. 7, in this embodiment, as AI controls a virtual character to move, if the virtual character needs to rotate, the virtual character rotates from a first direction to a third direction, then rotates from the third direction to a fourth direction until an animation is displayed that the virtual character rotates smoothly, and finally rotates to a second direction. That is, the sum of an angle of rotation from the first direction to the third direction, an angle of rotation from the third direction to the fourth direction, and an angle of rotation from the fourth direction to the second direction is the same as a corresponding angle of rotation from the first direction to the second direction as shown in FIG. 6. The third direction and the fourth direction are merely examples, which may include, but is not limited to, directions obtained from more rotations.

In this embodiment, the movement process of the first virtual character may include, but is not limited to, generating a control instruction for moving the first virtual character after the server receives a request for moving the first virtual character, so as to control the movement of the first virtual character.

Figure 8:
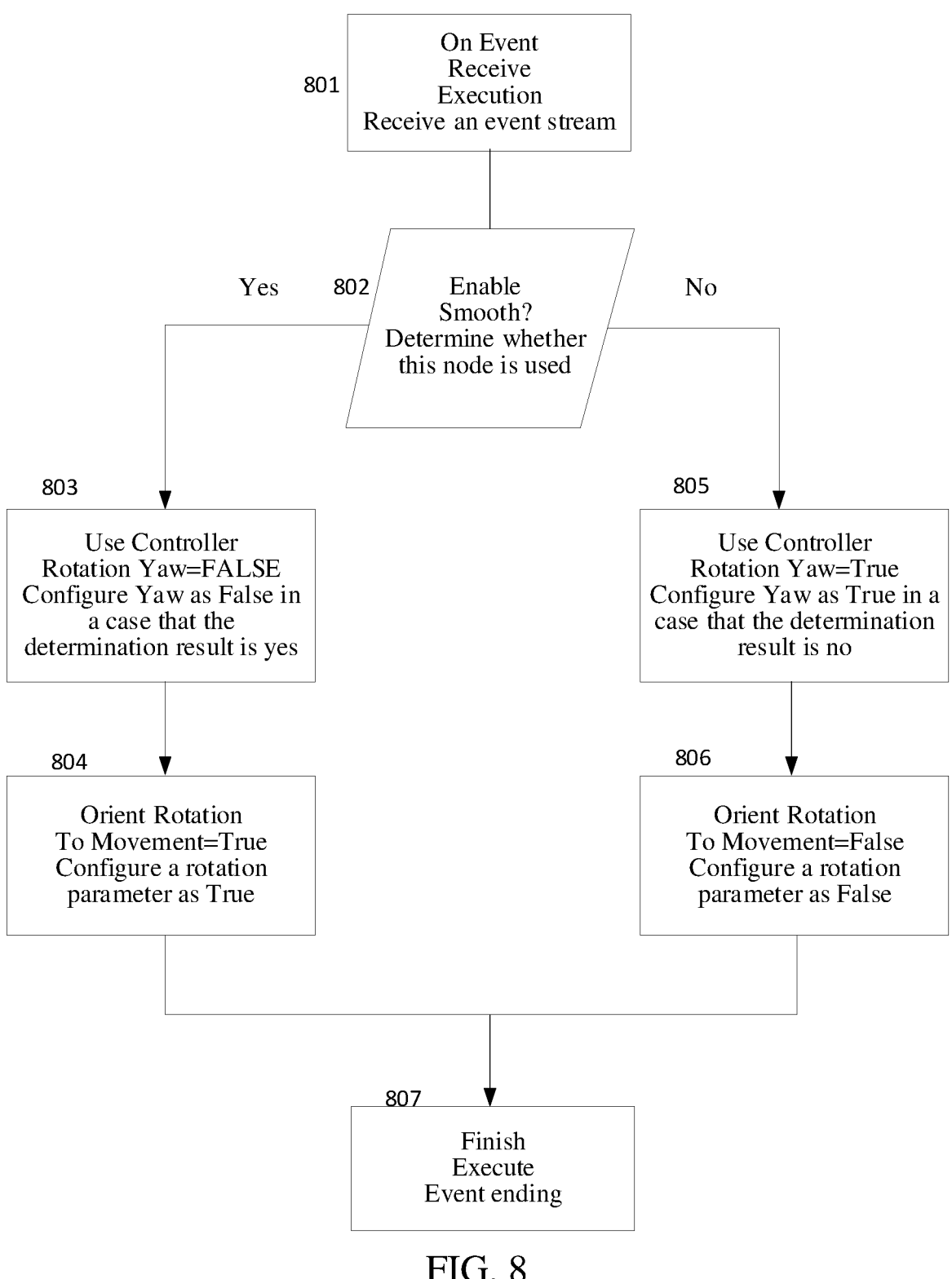
FIG. 8 is a schematic diagram of another virtual character control method according to an embodiment of this application.

In this embodiment, the operation of controlling the first virtual character to perform multiple rotations continuously from the first direction to the second direction may be implemented by interpolation, but is not limited thereto. For example, the EnableSmoothRotation node of the behavior tree logic performs the following logic:

For example, FIG. 8 is a schematic diagram of another virtual character control method according to an embodiment of this application. As shown in FIG. 8, the method includes, but is not limited to, the following steps:

801: Receive an event stream (for example, an operation instruction in behavior tree logic for controlling movement of a virtual character).

802: Determine whether an EnableSmoothRotation node is used.

803: Configure a rotation parameter (for example, including but not limited to a Yaw parameter, a Roll parameter, a Pitch parameter, and the like) as False when the determination result is yes.

804: Configure the rotation parameter as True, and perform step 807.

805: Configure the rotation parameter as True when the determination result is no.

806: Configure the rotation parameter as False, and perform step 807.

807: End a Finish Execute event.

Yaw is a manner of expressing rotation in Euler angles, and the Euler angles are the simplest manner of expressing rotation in the form of a three-dimensional vector and have values representing angles of rotation of an object about three axes (x-axis, y-axis, and z-axis) of a coordinate system, and Yaw is an angle of rotation about the z-axis.

Through this embodiment, a virtual scene in which a first virtual character is located and the first virtual character in the virtual scene are displayed. The first virtual character is a non-player controlled character. A target turning instruction is obtained in a movement process of the first virtual character. The target turning instruction is used for instructing the first virtual character to rotate from a first direction to a second direction. The first virtual character is controlled to perform multiple rotations continuously from the first direction to the second direction in the movement process of the first virtual character in response to the target turning instruction. In this way, multiple rotations are performed continuously according to the target turning instruction in the movement process of the first virtual character, whereby an AI virtual character designed based on a behavior tree is more like a real person player, thereby achieving the purpose of smoothly turning the AI virtual character and making behavior actions close to the real person player. Thus, the technical effect of optimizing the behavior performance of a virtual character controlled by AI and making the virtual character controlled by AI more personified, thereby solving the technical problem in the related art that the performance of the virtual character is not personified and the turning is not realistic when the virtual character is controlled by AI.

As a solution, the operation of controlling, in the movement process of the first virtual character, the first virtual character to perform multiple rotations continuously from the first direction to the second direction includes:

controlling, in the rotation process of the first virtual character, the first virtual character to perform N rotations continuously from the first direction to the second direction, the first virtual character rotating at a same rotation angle in at least first N−1 rotations among the N rotations, and N being a positive integer greater than or equal to 2.

In this embodiment, N may be flexibly configured according to an angle between the first direction and the second direction and a model size of the virtual character. For example, N is configured to be positively correlated with the model size of the virtual character. N is greater when the model size of the virtual character is greater. N may also be certainly configured according to the angle between the first direction and the second direction uniformly.

For example, FIG. 9 is a schematic diagram of another virtual character control method according to an embodiment of this application. As shown in FIG. 9, the method includes, but is not limited to, the following steps:

A virtual scene 902 is an example of a first virtual character rotating from a first direction to a second direction in a movement process of the first virtual character in the related art. The first virtual character moves to the east before turning, and directly turns from the east to the north after receiving a turning instruction for turning to move to the north.

A virtual scene 904 is an example of the first virtual character rotating from the first direction to the second direction in the movement process of the first virtual character in this embodiment. The first virtual character moves to the east before turning. After receiving a turning instruction for turning to move to the north, the rotation of the virtual character is interpolated, whereby the virtual character smoothly and continuously performs N rotations and turns from the east to the north.

In this embodiment, the rotation angle of each rotation of the first virtual character may be configured by a system or determined according to an angle value between the first direction and the second direction, but is not limited thereto. The rotation angle of each rotation may be configured to the same or the rotation angle of each rotation may be gradually increased or decreased according to a progressive relationship.

As a solution, the operation of controlling, in the movement process of the first virtual character, the first virtual character to perform multiple rotations continuously from the first direction to the second direction includes:

controlling, in the rotation process of the first virtual character, the first virtual character to perform N rotations continuously from the first direction to the second direction, a time interval between every two rotations among the N rotations being less than or equal to a preset duration, and the time interval being used for causing the first virtual character to rotate smoothly from the first direction to the second direction.

In this embodiment, the time interval between every two adjacent rotations among the multiple rotations is less than or equal to the preset duration, and may include, but is not limited to, enabling the rotation process of the virtual character to be smoothly displayed in the virtual scene. That is, the time interval is used for smoothly rotating the first virtual character from the first direction to the second direction.

Figure 10:
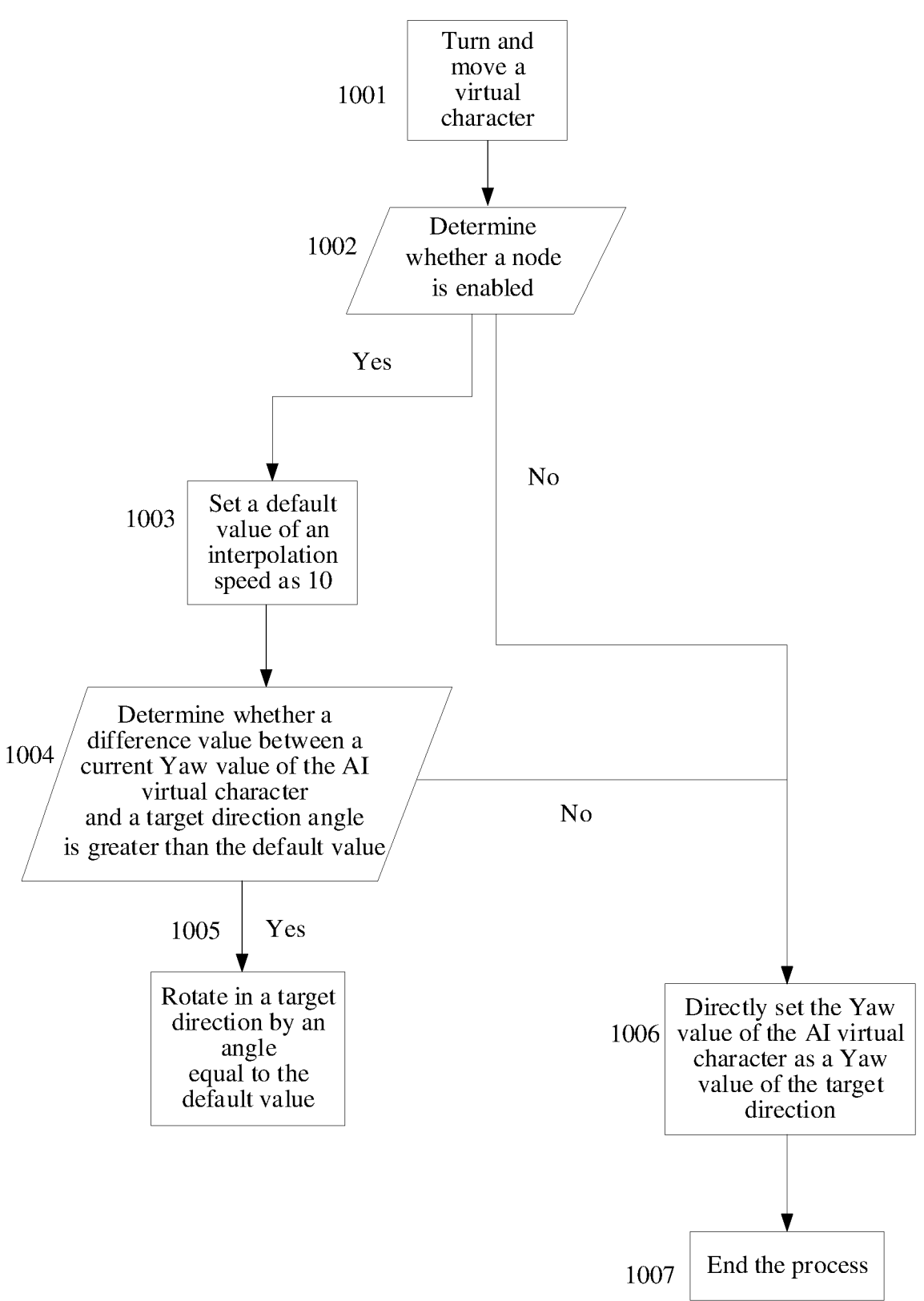
FIG. 10 is a schematic diagram of another virtual character control method according to an embodiment of this application.

For example, FIG. 10 is a schematic diagram of another virtual character control method according to an embodiment of this application. As shown in FIG. 10, the method includes, but is not limited to, the following steps:

1001: Receive a control message for instructing a virtual character to turn and move.

1002: Determine whether a node (smooth rotation function) is enabled.

1003: Set a default value of an interpolation speed as 10 when the determination result is yes, the interpolation speed being an angle of each rotation of the first virtual character.

1004: Determine whether a difference value between a current rotation parameter value (for example, including but not limited to a Yaw parameter value, a Roll parameter value, a Pitch parameter value, and the like) of an AI virtual character and a target direction angle is greater than the default value.

1005: Rotate in a target direction by an angle equal to the default value when the determination result is yes.

1006: Directly set the rotation parameter value of the AI virtual character as a rotation parameter value of the target direction (corresponding to the foregoing second direction) when the determination result of step 1002 or step 1004 is no.

1007: End the process.

As a solution, the operation of controlling, in the rotation process of the first virtual character, the first virtual character to perform multiple rotations continuously from the first direction to the second direction includes: controlling, in the rotation process of the first virtual character, the first virtual character to perform multiple rotations continuously from the first direction to the second direction when a smooth rotation function corresponding to the first virtual character has been enabled, the smooth rotation function being used for controlling the first virtual character to rotate smoothly after being enabled.

As a solution, the operation of obtaining a target turning instruction in a movement process of the first virtual character includes: obtaining, in the movement process of the first virtual character, the target turning instruction transmitted by a non-player character controller. The operation of controlling, in the movement process of the first virtual character, the first virtual character to perform multiple rotations continuously from the first direction to the second direction in response to the target turning instruction includes: determining, in response to the target turning instruction, whether a smooth rotation function corresponding to the first virtual character is enabled, the smooth rotation function being used for controlling the first virtual character to rotate smoothly after being enabled; and controlling, in the movement process of the first virtual character, the first virtual character to perform multiple rotations continuously from the first direction to the second direction in response to determining that the smooth rotation function corresponding to the first virtual character is enabled.

In this embodiment, the target turning instruction transmitted by the non-player character controller may include, but is not limited to, a target turning instruction generated by the server or the system according to the setting of the virtual scene. For example, AI is configured to search for a player within a predetermined range and attack the player. When the player is found within the predetermined range, AI moves towards the player and generates a target turning instruction to turn to the player. An AI control mode in other scenes may also be specifically included.

In this embodiment, the case in which the smooth rotation function corresponding to the first virtual character is enabled may be determined by determining whether the smooth rotation function corresponding to the first virtual character is enabled, but is not limited thereto.

As a solution, the method further includes the following steps: displaying the first virtual character oriented toward a target virtual character, the target virtual character being a player-controlled character; and controlling the first virtual character to be oriented always toward the target virtual character in the movement process of the first virtual character.

As a solution, the method further includes the following steps: obtaining a target aiming instruction, the target aiming instruction being used for instructing the first virtual character to be oriented always toward a target virtual character in the movement process of the first virtual character, and the target virtual character is a player-controlled character; and controlling, in response to the target aiming instruction, the first virtual character to be oriented always toward the target virtual character in the movement process of the first virtual character.

In this embodiment, the target aiming instruction is used for instructing the first virtual character to keep the first virtual character aimed at the target virtual character in the movement process of the first virtual character. The target virtual character may include, but is not limited to, a player control character, and may certainly be a direction in which a virtual object or a virtual region is located.

Figure 11:
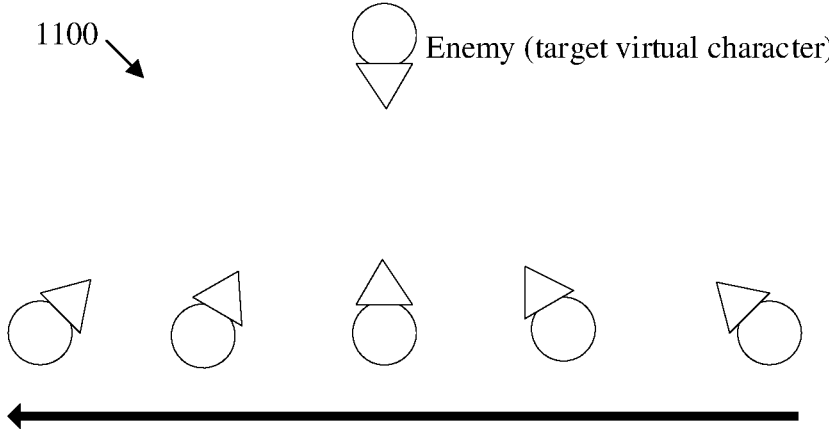
FIG. 11 is a schematic diagram of another virtual character control method according to an embodiment of this application.

For example, FIG. 11 is a schematic diagram 1100 of another virtual character control method according to an embodiment of this application. As shown in FIG. 11, the operation of controlling, in response to the target aiming instruction, the first virtual character to be oriented always toward the target virtual character in the movement process of the first virtual character may include, but is not limited to, the following content:

controlling, as the first virtual character moves from right to left, the first virtual character to always aim at an enemy (corresponding to the foregoing target virtual character).

As a solution, the operation of controlling the first virtual character to be oriented always toward the target virtual character in the movement process of the first virtual character includes: controlling a lower body of the first virtual character to move in a target movement direction in the movement process of the first virtual character, and controlling an upper body of the first virtual character to be oriented always toward the target virtual character.

As a solution, the operation of controlling, in response to the target aiming instruction, the first virtual character to be oriented always toward the target virtual character in the movement process of the first virtual character includes: controlling, in response to the target aiming instruction, a lower body of the first virtual character to move in a target movement direction in the movement process of the first virtual character, and controlling an upper body of the first virtual character to be oriented always toward the target virtual character.

In this embodiment, this may include, but is not limited to, adding an AI preview animation system to the behavior tree logic to set an aiming function (SetFocus Service) node, thereby controlling, in response to the target aiming instruction, the first virtual character to move in the target movement direction in the movement process of the first virtual character, controlling the upper body and the lower body of the first virtual character to simultaneously move in the target movement direction in the movement process, and controlling the upper body of the first virtual character to be oriented always toward the target virtual character.

Specifically, the behavior tree logic calls Aim-Offset in an animation logic layer, so as to achieve smooth aiming of the upper body of AI to the target in combination with the behavior tree to mount on a required node position. When this node is mounted on a certain branch of the behavior tree logic, it may be realized that the upper body calls Aim-offset of the animation system, and the lower body merges Blend-space that the character moves in eight directions, whereby the upper body always aims at an enemy with a muzzle, and the lower body moves laterally.

Figure 12:
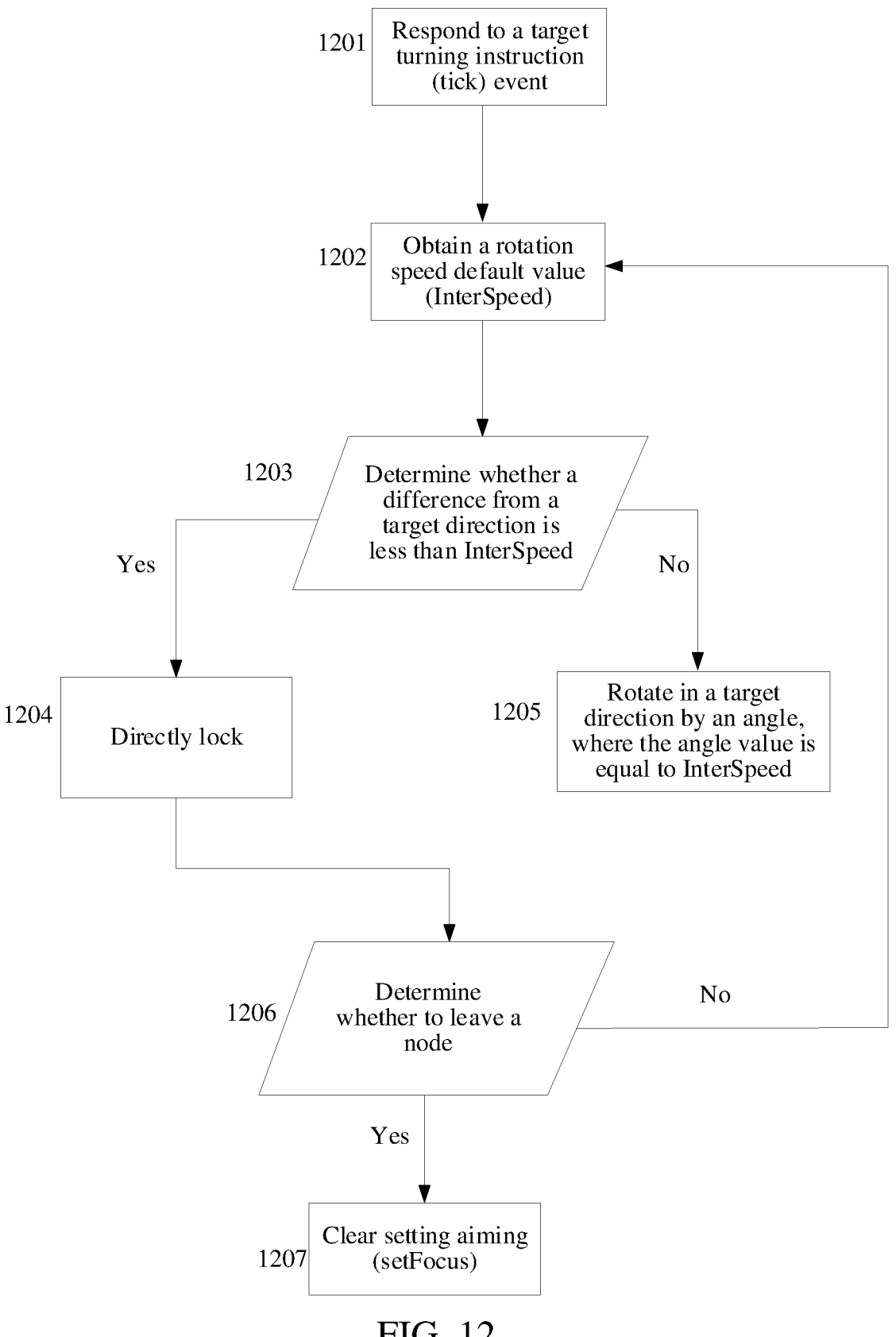
FIG. 12 is a schematic diagram of another virtual character control method according to an embodiment of this application.

In this embodiment, FIG. 12 is a schematic diagram of another virtual character control method according to an embodiment of this application. As shown in FIG. 12, the operation of determining, in response to the target turning instruction, whether a smooth rotation function corresponding to the first virtual character is enabled and controlling, in the movement process of the first virtual character, the first virtual character to perform multiple rotations continuously from the first direction to the second direction in response to determining that the smooth rotation function corresponding to the first virtual character is enabled may include, but is not limited to, the following steps:

1201: Respond to a tick event (corresponding to obtaining the target turning instruction transmitted by the non-player character controller).

1202: Obtain a rotation speed default value (InterSpeed, namely, the foregoing interpolation speed or the angle of each rotation of the first virtual character).

1203: Determine whether a difference from a target direction is less than InterSpeed.

1204: Directly lock the orientation of the virtual character (corresponding to the foregoing rotation to the second direction) when the determination result is yes.

1205: Rotate in a target direction by an angle (second direction) when the determination result of step 1203 is no, where the angle value is equal to InterSpeed.

1206: Determine whether to leave the EnableSmoothRotation node, and return to step 1202 when the determination result is no.

1207: Clear setFocus (ending the current process, where the foregoing nodes may be closed or not closed at the same time according to actual requirements) when the determination result is yes.

As a solution, the operation of controlling the first virtual character to be oriented always toward the target virtual character in the movement process of the first virtual character includes: controlling, when the first virtual character holds a virtual attack prop and in the movement process of the first virtual character, the virtual attack prop held by the first virtual character to always aim at the target virtual character; or controlling the first virtual character to be oriented always toward the target virtual character when the first virtual character does not hold a virtual attack prop and in the movement process of the first virtual character.

As a solution, the operation of controlling, in response to the target aiming instruction, the first virtual character to be oriented always toward the target virtual character in the movement process of the first virtual character includes: controlling, when the first virtual character holds a virtual attack prop, the virtual attack prop held by the first virtual character to always aim at the target virtual character in the movement process of the first virtual character in response to the target aiming instruction; or controlling, when the first virtual character does not hold a virtual attack prop, the first virtual character to be oriented always toward the target virtual character in the movement process of the first virtual character in response to the target aiming instruction.

In this embodiment, the virtual attack prop may include, but is not limited to, virtual guns, virtual throws, virtual near-war weapons, and the like. The operation of controlling the virtual attack prop held by the first virtual character to always aim at the target virtual character may include, but is not limited to, allowing the upper body of the first virtual character and the virtual attack prop to face the target virtual character.

This application is further explained below in conjunction with specific complete examples:

Before the adoption of this embodiment, since the traditional AI design only focuses on the logical control of a behavior tree instead of the animation performance of AI, the behavior tree often "decides to turn AI" instantaneously.

The reason for this problem is an underlying mechanism in a Movement Component of UE4. When receiving an input operation of the AI Controller, an AI controlled virtual character needs interpolation rotation to achieve smoothness. AI may move while turning to avoid "turning at a right angle" instantaneously, and AI may also smoothly call Aim-Offset of the character when fighting, so as to achieve turning around to shoot while walking and turning around to shoot while sliding tackle.

This embodiment is composed of two technical parts: AI turns smoothly while moving to turn; and AI can pre-aim in a certain direction in advance and move at the same time by calling Aim-offset of the animation system, that is, the standard action of the upper body merges with the movement of the lower body.

In terms of logic layers, an animation logic layer is added based on the traditional "behavior tree controls AI controller→AI controller controls character".

In terms of animation logic, two nodes are designed: an EnableSmoothRotation node and an AI preview animation system SetFocus Service node.

The EnableSmoothRotation node is used for allowing the AI controller to smoothly turn to a character movement direction for use with a behavior tree when AI moves. The node may be enabled when needed and disabled when not needed.

When the node is enabled, a movement component of a player character is notified, and interpolation turning rather than instantaneous turning is performed each time the player moves and turns.

The AI preview animation system SetFocus Service node may allow the behavior tree to call Aim-Offset in the animation logic layer, so as to achieve smooth aiming of the upper body of AI to the target in combination with the behavior tree to mount on a required position.

In this way, when this node is mounted on a certain branch of the behavior tree, it may be realized that the upper body calls Aim-offset of the animation system, and the lower body merges Blendspace that the character moves in eight directions, whereby the upper body always aims at an enemy with a muzzle, and the lower body moves laterally.

Figure 13:
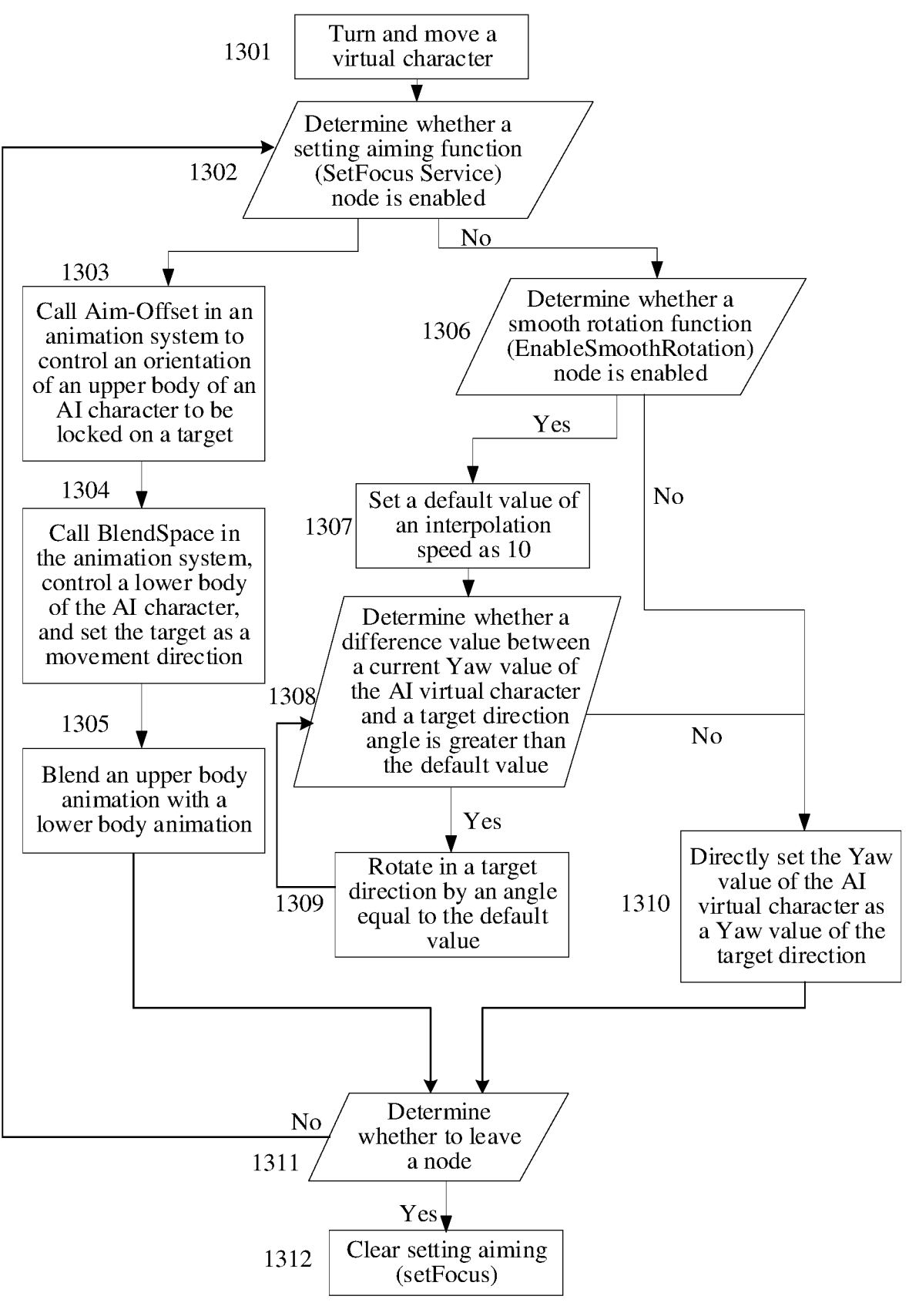
FIG. 13 is a schematic diagram of another virtual character control method according to an embodiment of this application.

FIG. 13 is a schematic diagram of another virtual character control method according to an embodiment of this application. As shown in FIG. 13, the virtual character control method may include, but is not limited to, the following steps:

1301: Receive a control message for instructing a virtual character to turn and move.

1302: Determine whether a SetFocus Service node is enabled.

1303: Call Aim-Offset in an animation system to control an orientation of an upper body of an AI virtual character to be locked on a target (corresponding to the foregoing target virtual character) when the determination result of step 1302 is yes.

1304: Call BlendSpace in the animation system, control a lower body of the character, and set the target (predetermined movement direction) as a movement direction.

1305: Blend an upper body animation with a lower body animation, and perform step 1311.

1306: Determine whether a smooth rotation function node (EnableSmoothRotation) is enabled when the determination result of step 1302 is no.

1307: Set a default value of an interpolation speed as 10 when the determination result is yes.

1308: Determine whether a difference value between a current Yaw value of the AI virtual character and a target direction angle is greater than the default value.

1309: Rotate in a target direction by an angle equal to the default value when the determination result is yes.

1310: Directly set the Yaw value of the AI virtual character as a Yaw value of the target direction (corresponding to the foregoing second direction) when the determination result of step 1302 or step 1304 is no.

1311: Determine whether to leave the node, and return to step 1302 when the determination result is no.

1312: Clear SetFocus when the determination result of step 1311 is yes.

With this embodiment, AI may smoothly turn in conjunction with an animation blend space, thereby making behavior actions close to real person players.

To simplify the description, the foregoing method embodiments are described as a series of action combinations. But those of ordinary skill in the art may know that this application is not limited to any described order of actions, as some steps may be executed in other orders or simultaneously according to this application. Secondly, those skilled in the art will also appreciate that the actions and modules involved in the embodiments described in the specification are not necessarily required by this application.

Figure 14:
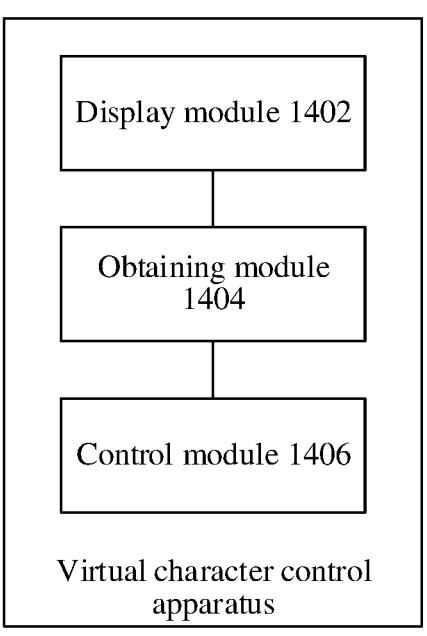
FIG. 14 is a schematic structural diagram of a virtual character control apparatus according to an embodiment of this application.

According to another aspect of this embodiment of this application, a virtual character control apparatus for implementing the foregoing virtual character control method is further provided. As shown in FIG. 14, the apparatus includes:

a first display module 1402, configured to display a virtual scene in which a first virtual character is located and the first virtual character in the virtual scene, the first virtual character being a non-player controlled character;

a second display module 1404, configured to obtain a target turning instruction in a movement process of the first virtual character, the target turning instruction being used for instructing the first virtual character to rotate from a first direction to a second direction; and a first control module 1406, configured to control, in the movement process of the first virtual character, the first virtual character to perform multiple rotations continuously from the first direction to the second direction in response to the target turning instruction.

According to another aspect of the embodiments of this application, a virtual character control apparatus is further provided, including: a first display module, configured to display a virtual scene in which a first virtual character is located and the first virtual character, the first virtual character being a non-player controlled character; a second display module, configured to display a rotation process of the first virtual character from a first direction to a second direction in a movement process of the first virtual character; and a first control module, configured to control, in the rotation process of the first virtual character, the first virtual character to perform multiple rotations continuously from the first direction to the second direction.

As a solution, the apparatus is configured to control, in the rotation process of the first virtual character, the first virtual character to perform multiple rotations continuously from the first direction to the second direction by: controlling, in the rotation process of the first virtual character, the first virtual character to perform multiple rotations continuously from the first direction to the second direction when a smooth rotation function corresponding to the first virtual character has been enabled, the smooth rotation function being used for controlling the first virtual character to rotate smoothly after being enabled.

As a solution, the apparatus is further configured to: display the first virtual character oriented toward a target virtual character, the target virtual character being a player-controlled character; and control the first virtual character to be oriented always toward the target virtual character in the movement process of the first virtual character.

As a solution, the apparatus is configured to control the first virtual character to be oriented always toward the target virtual character in the movement process of the first virtual character by: controlling a lower body of the first virtual character to move in a target movement direction in the movement process of the first virtual character, and controlling an upper body of the first virtual character to be oriented always toward the target virtual character.

As a solution, the apparatus is configured to control the first virtual character to be oriented always toward the target virtual character in the movement process of the first virtual character by: controlling, when the first virtual character holds a virtual attack prop and in the movement process of the first virtual character, the virtual attack prop held by the first virtual character to always aim at the target virtual character; or controlling the first virtual character to be oriented always toward the target virtual character when the first virtual character does not hold a virtual attack prop and in the movement process of the first virtual character.

As a solution, the first control module includes: a first control unit, configured to control, in the rotation process of the first virtual character, the first virtual character to perform N rotations continuously from the first direction to the second direction, the first virtual character rotating at a same rotation angle in at least first N−1 rotations among the N rotations, and N being a positive integer greater than or equal to 2.

As a solution, the first control module includes: a second control unit, configured to control, in the rotation process of the first virtual character, the first virtual character to perform N rotations continuously from the first direction to the second direction, a time interval between every two rotations among the N rotations being less than or equal to a preset duration, the time interval being used for causing the first virtual character to rotate smoothly from the first direction to the second direction, and N being a positive integer greater than or equal to 2.

According to another aspect of the embodiments of this application, a virtual character control apparatus is further provided, including: a third display module, configured to display a virtual scene in which a first virtual character is located and the first virtual character, the first virtual character being a non-player controlled character; an obtaining module, configured to obtain a target turning instruction in a movement process of the first virtual character, the target turning instruction being used for instructing the first virtual character to rotate from a first direction to a second direction; and a second control module, configured to control, in the movement process of the first virtual character, the first virtual character to perform multiple rotations continuously from the first direction to the second direction in response to the target turning instruction.

As a solution, the apparatus is configured to obtain a target turning instruction in a movement process of the first virtual character by: obtaining, in the movement process of the first virtual character, the target turning instruction transmitted by a non-player character controller. The apparatus is configured to control, in the movement process of the first virtual character, the first virtual character to perform multiple rotations continuously from the first direction to the second direction in response to the target turning instruction by: determining, in response to the target turning instruction, whether a smooth rotation function corresponding to the first virtual character is enabled, the smooth rotation function being used for controlling the first virtual character to rotate smoothly after being enabled; and controlling, in the movement process of the first virtual character, the first virtual character to perform multiple rotations continuously from the first direction to the second direction in response to determining that the smooth rotation function corresponding to the first virtual character is enabled.

As a solution, the apparatus is further configured to: obtain a target aiming instruction, the target aiming instruction being used for instructing the first virtual character to be oriented always toward a target virtual character in the movement process of the first virtual character, and the target virtual character is a player-controlled character; and control, in response to the target aiming instruction, the first virtual character to be oriented always toward the target virtual character in the movement process of the first virtual character.

As a solution, the apparatus is configured to control, in response to the target aiming instruction, the first virtual character to be oriented always toward the target virtual character in the movement process of the first virtual character by: controlling, in response to the target aiming instruction, a lower body of the first virtual character to move in a target movement direction in the movement process of the first virtual character, and controlling an upper body of the first virtual character to be oriented always toward the target virtual character.

As a solution, the apparatus is configured to control, in response to the target aiming instruction, the first virtual character to be oriented always toward the target virtual character in the movement process of the first virtual character by: controlling, when the first virtual character holds a virtual attack prop, the virtual attack prop held by the first virtual character to always aim at the target virtual character in the movement process of the first virtual character in response to the target aiming instruction; or controlling, when the first virtual character does not hold a virtual attack prop, the first virtual character to be oriented always toward the target virtual character in the movement process of the first virtual character in response to the target aiming instruction.

According to one aspect of this application, a computer program product is provided. The computer program product includes computer programs/instructions. The computer programs/instructions contain program codes for performing the method shown in the flowchart. In such embodiment, the computer programs may be downloaded and installed over a network through a communication portion 1509, and/or installed from a detachable medium 1511. The computer programs, when executed by a central processing unit (CPU) 1501, perform various functions provided by this embodiment of this application.

The sequence numbers of the foregoing embodiments of this application are merely for description purpose but do not imply the preference among the embodiments.

Figure 15:
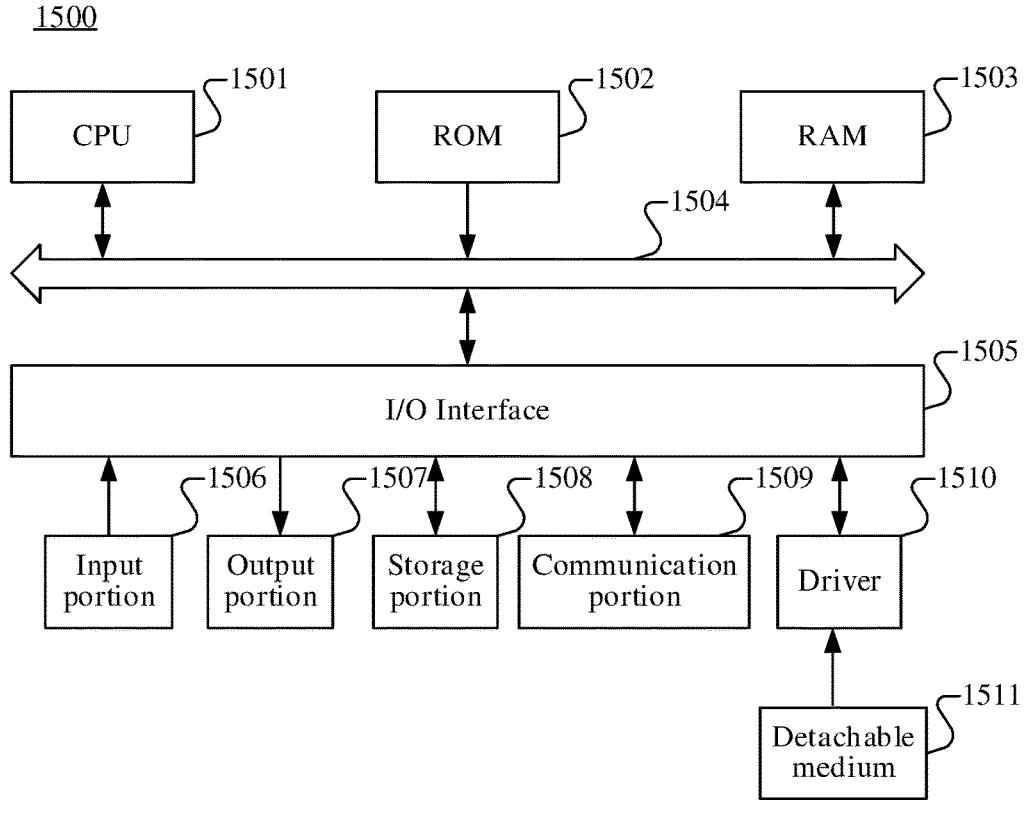
FIG. 15 is a schematic structural diagram of a virtual character control product according to an embodiment of this application.

FIG. 15 schematically shows a structural block diagram of a computer system configured to implement an electronic device according to an embodiment of this application.

A computer system 1500 of an electronic device shown in FIG. 15 is merely an example and may not pose any limitation on the scope of functionality or use of this embodiment of this application.

As shown in FIG. 15, the computer system 1500 includes a CPU 1501, which may perform various suitable actions and processing based on a program stored in a read-only memory (ROM) 1502 or a program loaded from a storage portion 1508 into a random access memory (RAM) 1503. In the RAM 1503, various programs and data required for system operation are also stored. The CPU 1501, the ROM

1502, and the RAM 1503 are connected via a bus 1504. An input/output (I/O) interface 1505 is also connected to the bus 1504.

The following components are connected to the I/O interface 1505: an input portion 1506 including a keyboard, a mouse, and the like; an output portion 1507 including, for example, a cathode ray tube (CRT), a liquid crystal display (LCD), a loudspeaker, and the like; the storage portion 1508 including a hard disk, and the like; and the communication portion 1509 including, for example, a network interface card such as a local area network card and a modem. The communication portion 1509 performs communication processing via a network such as the Internet. A driver 1150 is also connected to the I/O interface 1505 as required. The detachable medium 1511, such as a magnetic disk, an optical disk, a magneto-optical disk, or a semiconductor memory, is installed on the driver 1150 as required, whereby computer programs read therefrom are installed into the storage portion 1508 as required.

Particularly, according to this embodiment of this application, the processes described in the method flowcharts may be implemented as computer software programs. For example, this embodiment of this application provides a computer program product, which includes computer programs carried on a computer-readable medium. The computer programs include program codes used for performing the methods shown in the flowcharts. In such embodiment, the computer programs may be downloaded and installed over the network through the communication portion 1509, and/or installed from the detachable medium 1511. When the computer programs are executed by the CPU 1501, the various functions defined in the system of this application are performed.

According to yet another aspect of this embodiment of this application, an electronic device for implementing the foregoing virtual character control method is further provided. The electronic device may be a terminal device or a server as shown in FIG. 1. This embodiment is illustrated as the electronic device being the terminal device. As shown in FIG. 16, the electronic device includes a memory 1602 and a processor 1604. Computer programs are stored in the memory 1602. The processor 1604 is configured to perform the steps in any of the method embodiments by running the computer programs.

In this embodiment, the electronic device may be located in at least one network device among multiple network devices of a computer network.

In this embodiment, the processor may be configured to perform the following steps by running the computer programs:

S1: Display a virtual scene in which a first virtual character is located and the first virtual character in the virtual scene, the first virtual character being a non-player controlled character.

S2: Obtain a target turning instruction in a movement process of the first virtual character, the target turning instruction being used for instructing the first virtual character to rotate from a first direction to a second direction.

S3: Control, in the movement process of the first virtual character, the first virtual character to perform multiple rotations continuously from the first direction to the second direction in response to the target turning instruction.

Those of ordinary skill in the art may understand that the structure shown in FIG. 16 is only schematic. The electronic device may be a terminal device such as a smartphone (such as an Android mobile phone or an iOS mobile phone), a tablet computer, a palmtop computer, an MID, or a PAD.

The structure of the foregoing electronic device is not limited in FIG. 16. For example, the electronic device may further include more or fewer components (such as network interfaces) than shown in FIG. 16, or have different configurations than shown in FIG. 16.

The memory 1602 may be configured to store software programs and modules, such as program instructions/modules corresponding to the virtual character control method and apparatus in this embodiment of this application. The processor 1604 runs the software programs and modules stored in the memory 1602 so as to perform various functional applications and data processing, namely, implementing the foregoing virtual character control method. The memory 1602 may include a high speed random access memory and may further include a non-volatile memory, such as one or more magnetic storage apparatuses, a flash memory, or another non-volatile solid state memory. In some examples, the memory 1602 may further include memories remotely located with respect to the processor 1604. The remote memories may be connected to a terminal via a network. Examples of the network include, but are not limited to, the Internet, Intranet, local area networks, mobile communication networks, and combinations thereof. The memory 1602 may be specifically applied to information such as a virtual scene, but is not limited thereto. As an example, as shown in FIG. 16, the memory 1602 may include, but is not limited to, the display module 1402, the obtaining module 1404, and the control module 1406 in the virtual character control apparatus. In addition, the apparatus may further include, but is not limited to, other module units in the virtual character control apparatus, which are not described in detail in this example.

A transmission apparatus 1606 is configured to receive or transmit data via a network. Specific examples of the network may include a wired network and a wireless network. In one example, the transmission apparatus 1606 includes a network interface controller (NIC), which may be connected to another network device and router via a network cable so as to communicate with the Internet or a local area network. In one example, the transmission apparatus 1606 is a radio frequency (RF) module for communicating wirelessly with the Internet.

In addition, the electronic device further includes: a display 1608, configured to display the virtual scene; and a connection bus 1610, configured to connect the various module components in the electronic device.

In other embodiments, the terminal device or the server may be a node in a distributed system. The distributed system may be a blockchain system. The blockchain system may be a distributed system formed of multiple blockchain nodes connected by network communication. A peer to peer (P2P) network may be formed between the nodes. Any form of computing device, such as a server, a terminal, and other electronic devices, may become a node in the blockchain system by joining the P2P network.

According to one aspect of this application, a computer-readable storage medium is provided. A processor of a computer device reads computer instructions from the computer-readable storage medium. The processor executes the computer instructions to cause the computer device to perform the virtual character control method provided in various implementations of the foregoing virtual character control aspects.

In this embodiment, the computer-readable storage medium may be configured to store computer programs for performing the following steps:

S1: Display a virtual scene in which a first virtual character is located and the first virtual character in the virtual scene, the first virtual character being a non-player controlled character.

S2: Obtain a target turning instruction in a movement process of the first virtual character, the target turning instruction being used for instructing the first virtual character to rotate from a first direction to a second direction.

S3: Control, in the movement process of the first virtual character, the first virtual character to perform multiple rotations continuously from the first direction to the second direction in response to the target turning instruction.

In this embodiment, those of ordinary skill in the art may understand that all or some of the steps of the methods in the foregoing embodiments may be implemented by a program instructing relevant hardware. The program may be stored in a computer-readable storage medium. The storage medium may include: a flash disk, a ROM, a RAM, a magnetic or optical disk, and the like.

The sequence numbers of the foregoing embodiments of this application are merely for description purpose but do not imply the preference among the embodiments.

If the unit integrated in the foregoing embodiments is implemented in the form of a software functional unit and sold or used as an independent product, the unit may be stored in the computer-readable storage medium. Based on this understanding, the technical solution of this application, either inherently or in any part contributing to the related art, or all or part of the technical solution, may be embodied in the form of a software product. The computer software product is stored in the storage medium, and includes several instructions for causing one or more computer devices (which may be a personal computer, a server, or a network device) to perform all or part of the steps of the methods according to the various embodiments of this application.

In the foregoing embodiments of this application, the description of each embodiment is emphasized separately, and reference may be made to the relevant description of other embodiments for the parts of one embodiment that are not described in detail.

In several embodiments provided in this application, it is to be understood that the disclosed client may be implemented in other ways. The apparatus embodiments described above are merely examples. For example, division into the units is merely logical function division, and may be another division in an actual implementation. For example, multiple units or assemblies may be combined or may be integrated into another system, or some features may be ignored or not be performed. In addition, the displayed or discussed mutual couplings or direct couplings or communication connections may be implemented by using some interfaces. The indirect couplings or communication connections between the units or the modules may be electrical or in other forms.

The units described as separate components may or may not be physically separated, and components displayed as units may or may not be physical units, may be located in one position, or may be distributed over multiple network units. Some or all of the units may be selected based on actual requirements to achieve the objects of the solutions of this embodiment.

In addition, functional units in the various embodiments of this application may be integrated into one processing unit, the units may exist alone physically, or two or more units may be integrated into one unit. The integrated unit may be implemented in the form of hardware, or may be implemented in the form of a software functional unit.

The above descriptions are some implementations of this application. Those of ordinary skill in the art may make numerous improvements and modifications without departing from the principle of this application. These improvements and modifications shall fall within the scope of protection of this application.

What is claimed is:

1. A virtual character control method, performed by an electronic device, comprising:
   displaying a virtual scene in which a first virtual character is located and the first virtual character, the first virtual character being a non-player controlled character;
   displaying a rotation process of the first virtual character from a first direction to a second direction in a movement process of the first virtual character; and
   controlling, in the rotation process of the first virtual character, the first virtual character to perform multiple rotations continuously from the first direction to the second direction, wherein controlling the first virtual character to perform multiple rotations continuously comprises:
      controlling the first virtual character to perform N rotations continuously from the first direction to the second direction, the first virtual character rotating at a same rotation angle in at least first N−1 rotations among the N rotations, a time interval between every two adjacent rotations among the N rotations being less than or equal to a preset duration, the time interval being used for causing the first virtual character to rotate smoothly from the first direction to the second direction, and N being a positive integer greater than or equal to 2 and being flexibly configured according to an angle between the first direction and the second direction and a model size of the first virtual character.

2. The method according to claim 1, wherein controlling, in the rotation process of the first virtual character, the first virtual character to perform multiple rotations continuously from the first direction to the second direction comprises:
   controlling, in the rotation process of the first virtual character, the first virtual character to perform multiple rotations continuously from the first direction to the second direction when a smooth rotation function corresponding to the first virtual character has been enabled, the smooth rotation function being used for controlling the first virtual character to rotate smoothly after being enabled.

3. The method according to claim 1, further comprising:
   displaying the first virtual character oriented toward a target virtual character, the target virtual character being a player-controlled character; and
   controlling the first virtual character to be oriented always toward the target virtual character in the movement process of the first virtual character.

4. The method according to claim 3, wherein controlling the first virtual character to be oriented always toward the target virtual character in the movement process of the first virtual character comprises:
   controlling a lower body of the first virtual character to move in a target movement direction in the movement process of the first virtual character, and controlling an upper body of the first virtual character to be oriented always toward the target virtual character.

5. The method according to claim 3, wherein controlling the first virtual character to be oriented always toward the target virtual character in the movement process of the first virtual character comprises:

controlling, when the first virtual character holds a virtual attack prop and in the movement process of the first virtual character, the virtual attack prop held by the first virtual character to always aim at the target virtual character.

6. The method according to claim 3, wherein controlling the first virtual character to be oriented always toward the target virtual character in the movement process of the first virtual character comprises:

controlling the first virtual character to be oriented always toward the target virtual character when the first virtual character does not hold a virtual attack prop and in the movement process of the first virtual character.

7. An electronic device comprising:

a memory, the memory storing at least one computer program; and a processor in communication with the memory, the processor configured by the at least one computer program to:

display a virtual scene in which a first virtual character is located and the first virtual character, the first virtual character being a non-player controlled character;

obtain a target turning instruction in a movement process of the first virtual character, the target turning instruction being used for instructing the first virtual character to rotate from a first direction to a second direction; and control, in the movement process of the first virtual character, the first virtual character to perform multiple rotations continuously from the first direction to the second direction in response to the target turning instruction, wherein control the first virtual character to perform multiple rotations continuously comprises:

controlling the first virtual character to perform N rotations continuously from the first direction to the second direction, the first virtual character rotating at a same rotation angle in at least first N−1 rotations among the N rotations, a time interval between every two adjacent rotations among the N rotations being less than or equal to a preset duration, the time interval being used for causing the first virtual character to rotate smoothly from the first direction to the second direction, and N being a positive integer greater than or equal to 2 and being flexibly configured according to an angle between the first direction and the second direction and a model size of the first virtual character.

8. The electronic device according to claim 7:

wherein to obtain the target turning instruction in the movement process of the first virtual character, the processor is further configured to:

obtain, in the movement process of the first virtual character, the target turning instruction transmitted by a non-player character controller; and wherein to control, in the movement process of the first virtual character, the first virtual character to perform multiple rotations continuously from the first direction to the second direction in response to the target turning instruction the processor is further configured to:

determine, in response to the target turning instruction, whether a smooth rotation function corresponding to the first virtual character is enabled, the smooth rotation function being used for controlling the first virtual character to rotate smoothly after being enabled; and control, in the movement process of the first virtual character, the first virtual character to perform multiple rotations continuously from the first direction to the second direction in response to determining that the smooth rotation function corresponding to the first virtual character is enabled.

9. The electronic device according to claim 7, wherein the processor is further configured to:

obtain a target aiming instruction, the target aiming instruction being used for instructing the first virtual character to be oriented always toward a target virtual character in the movement process of the first virtual character, and the target virtual character is a player-controlled character; and control, in response to the target aiming instruction, the first virtual character to be oriented always toward the target virtual character in the movement process of the first virtual character.

10. The electronic device according to claim 9, wherein to control, in response to the target aiming instruction, the first virtual character to be oriented always toward the target virtual character in the movement process of the first virtual character, the processor is further configured to:

control, in response to the target aiming instruction, a lower body of the first virtual character to move in a target movement direction in the movement process of the first virtual character, and controlling an upper body of the first virtual character to be oriented always toward the target virtual character.

11. The electronic device according to claim 9, wherein control, in response to the target aiming instruction, the first virtual character to be oriented always toward the target virtual character in the movement process of the first virtual character, the processor is further configured to:

control, when the first virtual character holds a virtual attack prop, the virtual attack prop held by the first virtual character to always aim at the target virtual character in the movement process of the first virtual character in response to the target aiming instruction.

12. The electronic device according to claim 9, wherein to control, in response to the target aiming instruction, the first virtual character to be oriented always toward the target virtual character in the movement process of the first virtual character, the processor is further configured to:

control, when the first virtual character does not hold a virtual attack prop, the first virtual character to be oriented always toward the target virtual character in the movement process of the first virtual character in response to the target aiming instruction.

13. A non-transitory computer-readable storage medium, the non-transitory computer-readable storage medium having a stored program comprising instructions configured to cause a processor to:

display a virtual scene in which a first virtual character is located and the first virtual character, the first virtual character being a non-player controlled character;

display a rotation process of the first virtual character from a first direction to a second direction in a movement process of the first virtual character; and control, in the rotation process of the first virtual character, the first virtual character to perform multiple rotations continuously from the first direction to the second direction, wherein control the first virtual character to perform multiple rotations continuously comprises:

controlling the first virtual character to perform N rotations continuously from the first direction to the second direction, the first virtual character rotating at a same rotation angle in at least first N−1 rotations among the N rotations, a time interval between every two adjacent rotations among the N rotations being less than or equal to a preset duration, the time interval being used for causing the first virtual character to rotate smoothly from the first direction to the second direction, and N being a positive integer greater than or equal to 2 and being flexibly configured according to an angle between the first direction and the second direction and a model size of the first virtual character.

14. The non-transitory computer-readable storage medium according to claim 13, wherein the instructions for causing the processor to control, in the rotation process of the first virtual character, the first virtual character to perform multiple rotations continuously from the first direction to the second direction further comprise instructions for causing the processor to:

control, in the rotation process of the first virtual character, the first virtual character to perform multiple rotations continuously from the first direction to the second direction when a smooth rotation function corresponding to the first virtual character has been enabled, the smooth rotation function being used for controlling the first virtual character to rotate smoothly after being enabled.

15. The non-transitory computer-readable storage medium according to claim 13, wherein the stored program further comprises instructions for causing the processor to:

control displaying the first virtual character oriented toward a target virtual character, the target virtual character being a player-controlled character; and control the first virtual character to be oriented always toward the target virtual character in the movement process of the first virtual character.

16. The non-transitory computer-readable storage medium according to claim 15, wherein, to control the first virtual character to be oriented always toward the target virtual character in the movement process of the first virtual character, the stored program further comprises instructions for causing the processor to:

control a lower body of the first virtual character to move in a target movement direction in the movement process of the first virtual character, and control an upper body of the first virtual character to be oriented always toward the target virtual character.

17. The non-transitory computer-readable storage medium according to claim 15, wherein, to control the first virtual character to be oriented always toward the target virtual character in the movement process of the first virtual character, the stored program further comprises instructions for causing the processor to:

control, when the first virtual character holds a virtual attack prop and in the movement process of the first virtual character, the virtual attack prop held by the first virtual character to always aim at the target virtual character.

18. The non-transitory computer-readable storage medium according to claim 15, wherein, to control the first virtual character to be oriented always toward the target virtual character in the movement process of the first virtual character, the stored program further comprises instructions for causing the processor to:

control the first virtual character to be oriented always toward the target virtual character when the first virtual character does not hold a virtual attack prop and in the movement process of the first virtual character.

* * * * *